United States Patent
Alabern et al.

(10) Patent No.: US 10,703,280 B2
(45) Date of Patent: Jul. 7, 2020

(54) ACTUATOR MECHANISM FOR A FOLD REAR-VIEW MIRROR ASSEMBLY

(71) Applicant: Ficomirrors, S.A.U., Barcelona (ES)

(72) Inventors: Eduard Ferre Alabern, Barcelona (ES); Juan Linares Casals, Barcelona (ES)

(73) Assignee: FICOMIRRORS, S.A.U., Barcelona (ES)

( * ) Notice: Subject to any disclaimer, the term of this patent is extended or adjusted under 35 U.S.C. 154(b) by 83 days.

(21) Appl. No.: 16/002,663

(22) Filed: Jun. 7, 2018

(65) Prior Publication Data
US 2018/0354421 A1 Dec. 13, 2018

(30) Foreign Application Priority Data
Jun. 7, 2017 (EP) ..................................... 17382348

(51) Int. Cl.
*B60R 1/076* (2006.01)
*B60R 1/074* (2006.01)

(52) U.S. Cl.
CPC .............. *B60R 1/074* (2013.01); *B60R 1/076* (2013.01)

(58) Field of Classification Search
CPC ........... B60R 1/074; B60R 1/076; B60R 1/06; B60R 1/072; B60R 1/07; G02B 7/1828
See application file for complete search history.

(56) References Cited

U.S. PATENT DOCUMENTS

| 4,832,477 | A | * | 5/1989 | Torii ....................... B60R 1/074 248/478 |
| 2007/0029179 | A1 | * | 2/2007 | Brouwer ................. B60R 1/074 200/329 |
| 2007/0035862 | A1 | | 2/2007 | Brouwer et al. |
| 2008/0149803 | A1 | * | 6/2008 | Yoshida .................. B60R 1/074 248/479 |
| 2013/0242423 | A1 | * | 9/2013 | Palvoelgyi .............. B60R 1/074 359/841 |

(Continued)

FOREIGN PATENT DOCUMENTS

| DE | 602005003927 T2 | 12/2008 |
| EP | 2639112 A1 | 9/2013 |
| EP | 2644452 A1 | 10/2013 |

(Continued)

OTHER PUBLICATIONS

Extended European Search Report for Application No. 17382348.5, dated Nov. 7, 2017, 6 pages.

*Primary Examiner* — William R Alexander
*Assistant Examiner* — Balram T Parbadia
(74) *Attorney, Agent, or Firm* — Brooks Kushman P.C.

(57) ABSTRACT

The actuator mechanism comprises a first member associated with a pivotable rear-view mirror housing and movable therewith, a third member configured to be moved in directions towards and away from the first member, and a second member adapted to be locked in rotation to a fixed part of a motor vehicle as the first member is rotated by a first torque that does not exceed a maximum predetermined torque, and to move the third member in a direction towards the first member as the first member is rotated with a second torque that exceeds the maximum predetermined torque, causing the first member and the third member to be interlocked in a predetermined position of the first member.

20 Claims, 5 Drawing Sheets

(56) References Cited

U.S. PATENT DOCUMENTS

2013/0258510 A1* 10/2013 Sakata .................... B60R 1/06
    359/841
2013/0321941 A1* 12/2013 van Stiphout ............ B60R 1/06
    359/877

FOREIGN PATENT DOCUMENTS

| WO | 2012047104 A1 | 4/2012 |
| WO | 2013135756 A1 | 9/2013 |

* cited by examiner

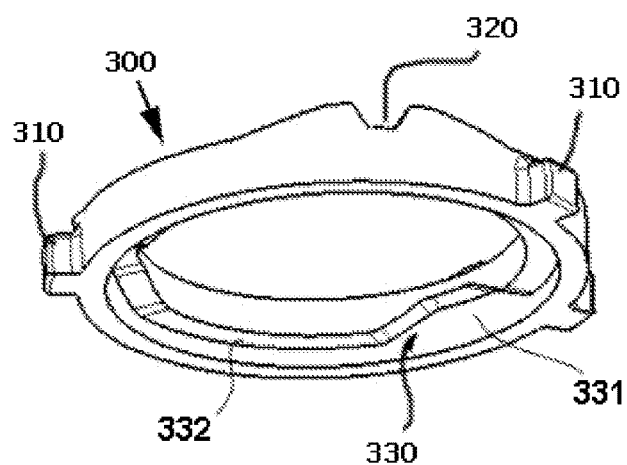
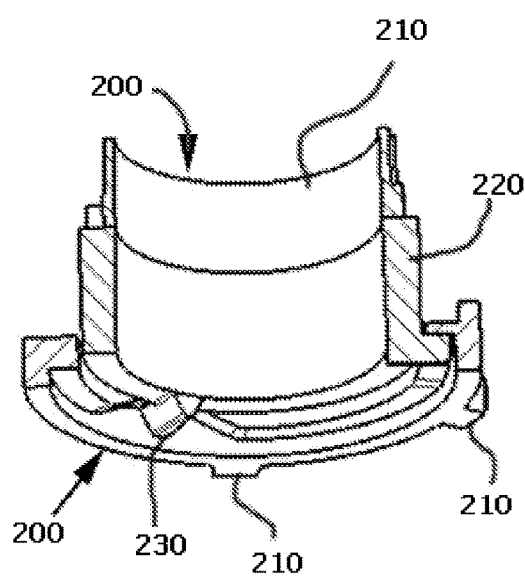
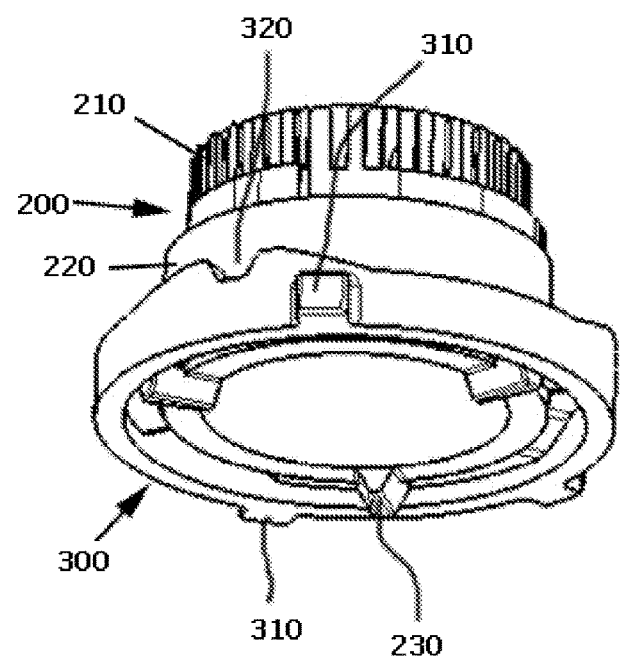

ACTUATOR MECHANISM FOR A FOLD REAR-VIEW MIRROR ASSEMBLY

CROSS-REFERENCE TO RELATED APPLICATIONS

This application claims the benefit of application Serial No. EP17382348.5 filed Jun. 7, 2017, the disclosure of which is hereby incorporated in its entirety by reference herein.

TECHNICAL FIELD

The present disclosure relates in general to rear-view mirror assemblies for motor vehicles, and more specifically to an actuator mechanism for a fold rear-view mirror assembly for motor vehicles.

BACKGROUND

Fold rear-view mirror assemblies for motor vehicles are driven through an electric motor between, for example, non-driving and driving positions. An electric motor is usually fitted inside a mirror housing which in turn also accommodates a mirror pane therein. As the electric motor is actuated, the mirror housing rotates around a mirror base or fixed part that is attached to a motor vehicle, usually to a motor vehicle body. The mirror housing can be thus positioned in at least the above mentioned two stable positions, namely, the non-driving and driving positions, corresponding to park and driving positions, respectively. A compression spring is usually fitted to act between the mirror housing and the mirror base or fixed part.

The mirror base or fixed part is provided with teeth adapted for cooperating with corresponding teeth formed in the mirror housing when the latter is rotated. Both the teeth in the mirror base and the teeth in the mirror housing define inclined planes which, in cooperation with the above-mentioned compression spring, provide a mechanical resistance against an inadvertent folding of the mirror housing relative to the mirror base between the at least two stable positions, namely the above mentioned non-driving and driving positions. For example, during travelling of the vehicle, where the mirror housing is positioned in the driving position to provide the driver a substantially rearward field of view, an inadvertent folding from the driving position towards the non-driving position may occur due to, for example, wind conditions.

When the electric motor does not work, or when a failure in the power supply occurs, and the user wishes to move the rear-view mirror housing into the driving position, a torque has to be applied by the user manually to the mirror housing so as to overcome interlocking of the teeth. The torque that is manually applied by the user is usually higher than the torque that is applied by the electric motor.

When the mirror housing is actuated manually relative to the mirror base around the mirror rotation axis, the teeth of the mirror base and the teeth of the mirror housing move relative to each other. During such relative movement, the respective inclined planes of the teeth cause the mirror housing to be raised or lowered relative to the mirror base depending on the direction of rotation of the mirror housing and the mirror base.

Downward movement of the mirror housing relative to the mirror base as it is rotated manually causes the mirror housing to move towards the mirror base compressing the compression spring. In this movement of the mirror housing towards the mirror base, the compression spring opposes rotation of the mirror housing for determining its relative angular positions. Upward movement of the mirror housing relative to the mirror base as it is rotated manually in the opposite direction causes the mirror housing to move away from the mirror base releasing the compression spring. The above configuration of teeth and inclined planes also define the above mentioned predefined driving and non-driving positions of the mirror housing.

One example of the above fold rear-view mirror assemblies is disclosed in U.S. Publication No. 2007035862 ("the '862 publication). The rear-view mirror assembly taught in the '862 publication comprises a hinge actuator with a base plate and a mirror support with cooperating stops. A coupling ring is arranged that can cooperate with the mirror support via a first set of cooperating stops, and can cooperate with the base plate via a second set of cooperating stops, such that in the first angle of the coupling ring, the spring force is transmitted, through cooperation of the first set of stops, and in the second angle, the spring force, through cooperation of the second set of stops, is transmitted to the base plate.

It however occurs that when the mirror housing is actuated manually, for example, when a failure of the electric motor for driving the rear-view mirror assembly occurs, or even if the user merely desires to drive the mirror housing manually, the above mentioned predefined driving and non-driving positions of the mirror housing may not well be achieved, since the teeth of the mirror base and the mirror housing have been moved relative to each other. This may result in that the mirror pane may not be positioned properly in the driving position to drive a motor vehicle.

International Publication No. WO2012047104 ("the '104 publication") relates to rear view mirror assembly for a vehicle comprising an adjustment instrument than includes a housing that is pivotally adjustable between a park position, a drive position and a fold-over position with respect to a base. The adjustment instrument further comprises an electrical drive unit provided in the housing, and a drive ring for coupling with the electrical drive unit.

Such a rear-view mirror assembly is made of a number of components which interact with one another in order to perform manual and powered driving of the assembly and also to lock the mirror housing in a given position. However, the rear-view mirror assembly described in the '104 publication has the disadvantage that if a given component is removed, the mirror assembly does not work, both in manual and powered mode, and cannot be driven into the locked position in drive position.

SUMMARY

The above disadvantages are overcome by the present actuator mechanism for fold rear-view mirror assemblies with which advantages are also obtained.

Specifically, the present actuator mechanism comprises a first member, a second member, and a third member.

The first member of the actuator mechanism is associated with a rear-view mirror housing and is movable therewith. For example, the first member may be attached to or be formed integral with the rear-view mirror housing so as to rotate therewith. The rear-view mirror housing is part of a motor vehicle fold rear-view mirror assembly and is configured to receive a mirror pane therein. The rear-view mirror housing is pivotable around an axis, for example a substantially vertical axis, relative to a fixed part of a motor vehicle. The fixed part of the motor vehicle may be for example the motor vehicle body or a part thereof.

The third member of the present actuator mechanism is configured to be moved in a direction towards the first member and in a direction away from the first member. For example, the third member may be adapted to be moved in a direction along the above mentioned substantially vertical axis towards and away from the first member. In order to perform such movement of the third member relative to the first member, a number of locking portions may be formed in the third member, as will be described further below.

When the rear-view mirror housing is driven in rotation through an electric motor between the above mentioned non-driving and driving positions, the third member is spaced apart from the first member and does not rotate as it is locked to the fixed part. As the rear-view mirror is operated, for example, under a failure in the electric motor for driving the rear-view mirror assembly occurs and the rear-view mirror housing cannot be rotated automatically but manually by the user, the third member is moved towards the first member so as to become interlocked in a given position. Driving of the third member relative to the first member is carried out by the second member as it will be described below.

It is to be noted that the third member of the present actuator mechanism is advantageously a separate part of the mechanism and can be installed in and removed from a fold rear-view mirror assembly easily. If the third member is removed, the fold rear-view mirror assembly works anyway.

The second member of the actuator mechanism is adapted to be locked in rotation to the fixed part of the motor vehicle as the first member is rotated by a first torque that does not exceed a maximum predetermined torque. The first torque corresponds to a torque that is applied when the first member is driven by an electric motor. The second member of the actuator mechanism is also adapted to move the third member, as stated above, in the direction towards the first member as the first member is rotated with a second torque that exceeds the maximum predetermined torque. The second torque corresponds to a torque that is applied when the first member is driven manually, in which case, the first member does not rotate relative to the second member, that is, they rotate together. The maximum predetermined torque corresponds to a torque required to unlock the second member from the fixed part as the mirror housing is driven manually.

When the second member is unlocked from the fixed part, the first member and the third member are able to interlock together in a predetermined position of the first member and the first member and the second member rotate together. The predetermined position where the first member and the third member are interlocked together may, for example, correspond to a rear-view mirror driving position for driving a motor vehicle.

It is preferred that the third member is arranged concentrically to the second member. Other arrangements could be possible.

As used herein, a first torque may refer to a torque applied by an electric motor in normal operation of the rear-view mirror assembly for rotating the rear-view mirror housing, and a second torque may refer to a torque applied manually by the user for manually rotating the rear-view mirror. Values of the first torque may be of the order of 2-10 Nm, such as for example 5 Nm, while values of the second torque may be of the order of 8-30 Nm, such as for example 14 Nm. Other torque values are of course possible. The maximum predetermined torque corresponds to the torque to be overcome in order to rotate the rear-view mirror housing relative to the fixed part and to unlock the second member from the fixed part without the use of electric power. The maximum predetermined torque depends on the configuration of locking portions in the rear-view mirror assembly that will be described below.

In one example, the second member comprises first and second driving portions. The first driving portion of the second member may be adapted to be driven in rotation by a driving gear, which in turn may be driven by a driving mechanism that may, for example, comprise an electric motor, as described above, fitted in the rear-view mirror housing. Thus, the driving mechanism causes, through the driving gear, the first member to rotate together with the rear-view mirror housing relative to the second member, and as the second member is locked to the fixed part, the first member also rotates relative to the fixed part. The second driving portion of the second member may have driving elements such as radial projections protruding radially therefrom so as to drive the third member in the above-mentioned direction towards the first member as the second member is rotated relative to the fixed part of the motor vehicle, as described above. Thus, in manual operation of the rear-view mirror housing, for example when the electric motor does not work, or when a failure in the power supply occurs, or even when the mirror housing is driven manually by the will of the user, a mechanical lock exists due to the transmission between the electric motor and the second member, specifically between the driving gear and a driving portion of second member. As the user moves manually the mirror applying a torque exceeding the maximum predetermined torque, locking portions formed in the second member are caused to move out of the fixed part and the first and second members move together. In such manual operation of the rear-view mirror housing where the first member and the second member move together, the second member rotates on the fixed part with the first member attached to the second member. The second driving portion of the second member may also have locking elements, e.g. teeth, so as to fit with corresponding locking elements, e.g. recesses, in the fixed part.

On the other hand, the third member may have inner guides formed therein through which the above mentioned radial projections of the second driving portion of the second member are allowed to slide. The inner guides of the third member may include inclined planes to help the third member to be moved by the second member in the above-mentioned directions towards and away from the first member. Alternatively, in other examples, the second driving portion of the second member could have external guides for receiving radial projections formed in the bottom side of the third member. The inner guides would be in this case provided with inclined planes suitable to move the third member in the above-mentioned directions towards and away from the first member.

In some examples of the third member, first and second locking portions are formed therein. The first and second locking portions of the third member may be projections, recesses or a combination of projections and recesses.

The first locking portions of the third member, that may be configured as locking projections projecting radially outwards, are adapted to lock the third member in rotation to the fixed part of the motor vehicle. In one example, such first locking portions configured as locking projections projecting radially outwards are adapted to be received into corresponding fixed locking recesses formed in the fixed part of the motor vehicle so as to lock the third member in rotation. Other configurations are also possible to lock the third member in rotation such as, for example, a number of locking recesses formed in the third member adapted for receiving corresponding locking projections formed in the fixed part of the motor vehicle. A combination of the above is also possible.

The second locking portions of the third member, that may be configured as locking recesses, are adapted to lock, e.g. to receive, first locking portions formed in the first member. The first locking portions of the first member may be, for example, protrusions projecting into the second locking portions, e.g. recesses, of the third member. Thus, as the first locking portions of the first member and the second locking portions of the third member are interlocked, the first member and the third member are interlocked together. Other configurations are of course possible such as for example with the first locking portions of the first member comprising recesses and with the second locking portions of the third member comprising projections for receiving the recesses of the first member, and even combinations of the above.

Thus, with the above configuration, as the rear-view mirror housing is actuated manually by the user, for example, when an external force or impact is applied, when the rear-view is operated manually, when no power is available or when there is a failure in the electric motor for driving the rear-view mirror housing, the above-mentioned driving and non-driving positions of the mirror housing are well defined. This is due to the locking portions of the first and third members. The interlocking condition of the second member and the fixed part allows the configuration of the assembly to be advantageously restored and be ready again for a normal operation when the rear-view mirror assembly can be operated normally again through the electric motor.

A fold rear-view mirror assembly for motor vehicles is also described herein. The present fold rear-view mirror assembly comprises a mirror housing that is configured to receive a mirror pane therein and adapted to rotate relative to a fixed part that is attached to a motor vehicle, such as for example a motor vehicle body.

The present fold rear-view mirror assembly further comprises an actuator mechanism, such as the one described above, for allowing the rear-view mirror housing to be positioned properly in a driving position manually in case of failure in the motor, when no power is available, when there is a failure in the electric motor for driving the rear-view mirror housing, when any problem occurs, or even when an external force or impact is applied, etc.

In the present fold rear-view mirror assembly, the actuator mechanism comprises a first member that is associated with the rear-view mirror housing and is movable therewith. The first member may have a number of first locking portions such that the first member can be locked against relative rotation as it will be described further below.

Also in the present fold rear-view mirror assembly, the actuator mechanism comprises a third member that is configured to be moved in directions towards and away from the first member. The third member may include first locking portions and it may further include second locking portions.

The first locking portions of the third member may be for example projections extending radially outwards to be received into corresponding first locking portions of the fixed part configured, for example, as locking recesses formed extending radially in the fixed part of the motor vehicle. The first locking portions of the third member may be further adapted to be driven in the direction towards the first member as the first member together with the second member are rotated relative to the fixed part of the motor vehicle.

Thus, with the first locking portions of the third member interlocked with the first locking portions of fixed part, for example, with the radial projections of the third member inserted in the recesses of the fixed part, the third member remains always locked in rotation relative to the fixed part.

The second locking portions of the third member are intended to be interlocked with corresponding first locking portions of the first member in a predetermined position such as in a driving position of the rear-view mirror assembly. Other configurations of the locking portions are of course possible such as, for example, with the first locking portions in the first member comprising recesses and with the second locking portions in the third member comprising projections for receiving the recesses, and even combinations of the above.

The actuator mechanism of the present fold rear-view mirror assembly further comprises a second member. The second member is configured to be locked in rotation to the fixed part of the motor vehicle as the first member is rotated by a first torque that does not exceed a maximum predetermined torque, for example, when the rear-view mirror assembly is operated by an electric motor.

The second member of the actuator mechanism is also adapted to move the third member in the above mentioned direction towards the first member as the first member is rotated with a second torque that exceeds the maximum predetermined torque, for example a torque applied by the user to rotate the rear-view mirror housing manually when a failure in the motor, when no power is available, when there is a failure in the electric motor for driving the rear-view mirror housing, when any problem occurs, or even when an external force or impact is applied, etc. This causes the first member and the third member to be able to be interlocked in a predetermined position of the first member, such as for example a position of a rear-view mirror suitable for driving a motor vehicle, referred herein to as rear-view mirror driving position.

As stated above, the first member may have first locking portions adapted to be locked in corresponding second locking portions of third member such that the first member and the third member are interlocked together. In one example, the first locking portions in the first member may comprise projections and the second locking portions of the third member may comprise recesses adapted for receiving the projections. Other configurations are possible. For example, the first locking portions of the first member may comprise recesses and the second locking portions of the third member may comprise projections adapted to be received in the recesses.

First and second driving portions may be formed in the second member. The first driving portion of the second member may be adapted to be driven by a driving gear so as to rotate the first member. The driving gear is in turn driven by a driving mechanism that may, for example, comprise an electric motor, as described above, fitted in the rear-view mirror housing. Thus, in use, the driving mechanism with the driving gear causes the first member to rotate together with the rear-view mirror housing relative to the fixed part. The second driving portion of the second member may have locking portions configured for example as radial projections protruding radially therefrom. The locking portions of the second driving portion of the second member act to drive the third member in the above-mentioned direction towards the first member as the first member is rotated relative to the fixed part of the motor vehicle.

The third member may in some examples be provided with inner guides. Such inner guides may be adapted to receive the above mentioned radial projections of the second driving portion of the second member to slide therein. The inner guides of the third member may include inclined planes arranged to help the second member to move the third member in the above-mentioned direction towards and away from the first member.

The second driving portion of the second member may also have external guides. Radial projections formed in the third member may be configured to slide through the external guides in the second driving portion of the second member. The external guides are provided with inclined planes suitable to move the third member in the above-mentioned directions towards and away from the first member.

The present rear-view mirror assembly having the above configuration solves the problem of properly arranging the rear-view mirror housing in a driving position manually when a failure in the motor, when no power is available, when there is a failure in the electric motor for driving the rear-view mirror housing, when any problem occurs, or even when an external force or impact is applied, etc. ensuring that the driving position is correct, due to the locking portions of the first and third elements that become correctly interlocked in any of the positions of the rear-view mirror housing. The interlocking condition of the second member and the fixed part allows the configuration of the assembly to be advantageously restored and to be ready again for a normal operation when the rear-view mirror assembly can be operated normally through the electric motor.

A further advantage of the present disclosure is that the third member is a separate part that can be fitted in a rear-view mirror assembly and removed therefrom as required. This is an advantage as the rear-view mirror assembly can be supplied with or without the third member while the rear-view mirror assembly still operates properly. This results in that different features or performances can be supplied with the same rear-view mirror assembly depending on the requirements.

Additional objects, advantages and features of examples of the present fold rear-view mirror assembly for motor vehicles and actuator mechanism therefor will become apparent to those skilled in the art upon examination of the description, or may be learned by practice thereof.

BRIEF DESCRIPTION OF THE DRAWINGS

Particular embodiments of a fold rear-view mirror assembly for motor vehicles and actuator mechanism therefor will be described in the following by way of non-limiting examples, with reference to the appended drawings, in which:

FIG. 7 is a perspective view of the third member;

FIG. 8 is a fragmentary perspective sectional view of the third member and the second member; and FIG. 9 is a perspective view of the third member and the second member.

DETAILED DESCRIPTION

Figure 1:
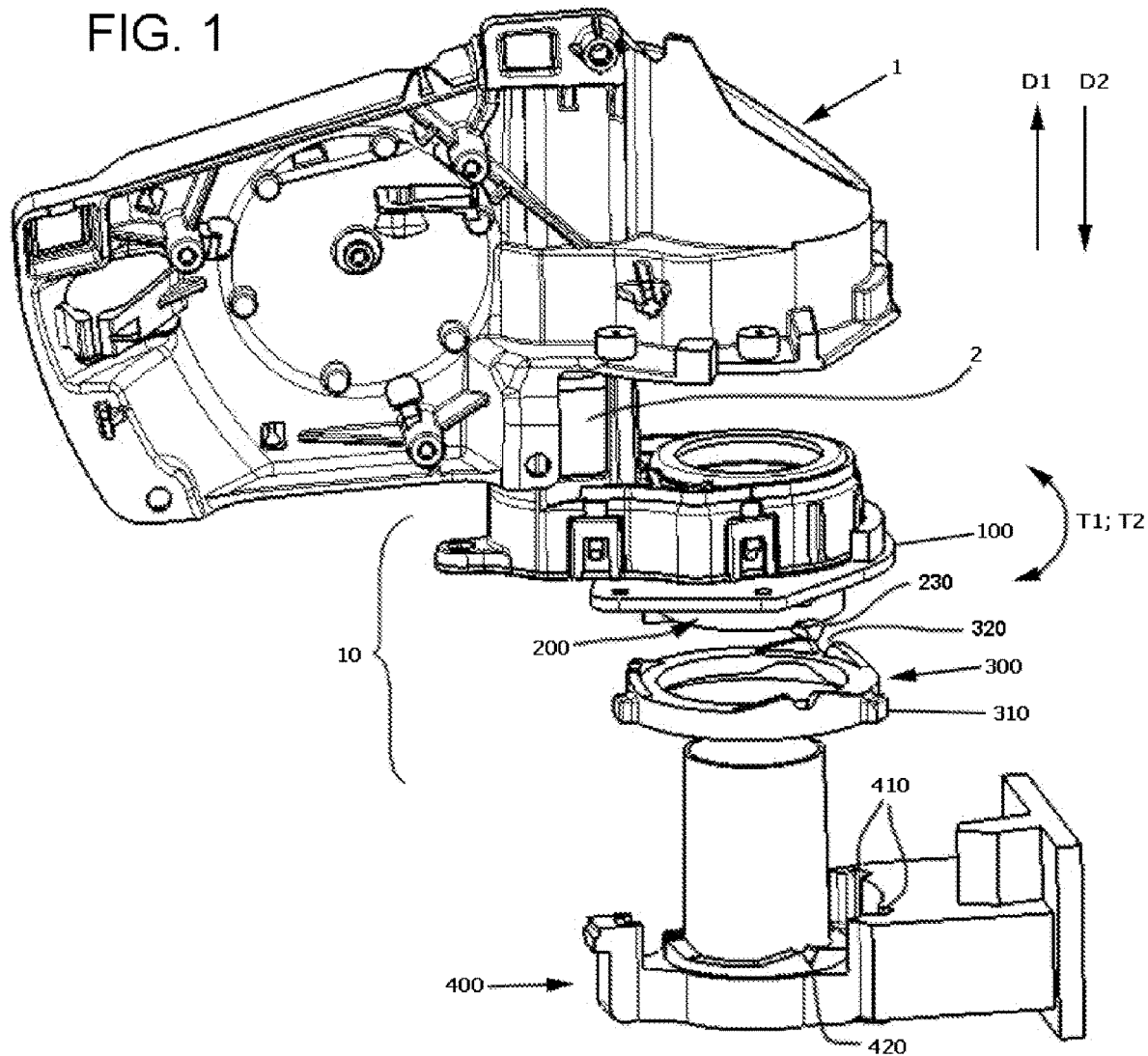
FIG. 1 is an exploded perspective view of one example of the fold rear-view mirror assembly for motor vehicles.

One example of a fold rear-view mirror assembly for motor vehicles and an actuator mechanism therefor will be described in the following according to the figures.

The fold rear-view mirror assembly designated in the example that is described herein comprises a mirror housing 1 suitable for receiving a mirror pane therein, not shown. A motor housing 2 is attached to or is part of the mirror housing 1 and is adapted to receive an electric motor, not shown, therein. The electric motor is connected with a driving gear 120, that will be described below, for rotating a first member 100, and thus the mirror housing 1, relative to an upwardly extending stem formed in a fixed part 400 that is attached to a motor vehicle body.

Figure 2:
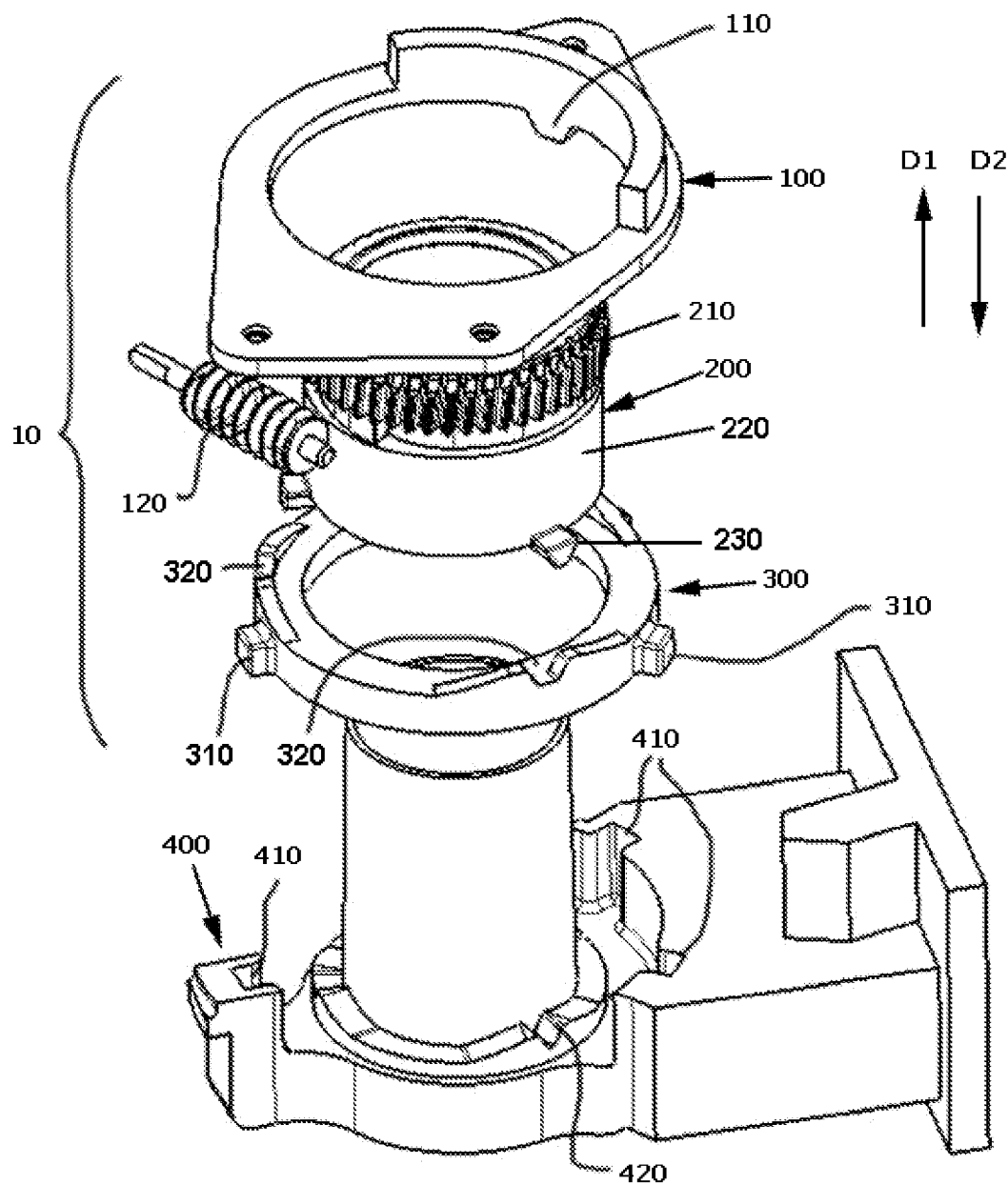
FIG. 2 is an exploded perspective view of the fold rear-view mirror assembly for motor vehicles shown in FIG. 1 illustrating in detail the assembly of the first member, the second member and the third member.
Figure 3:
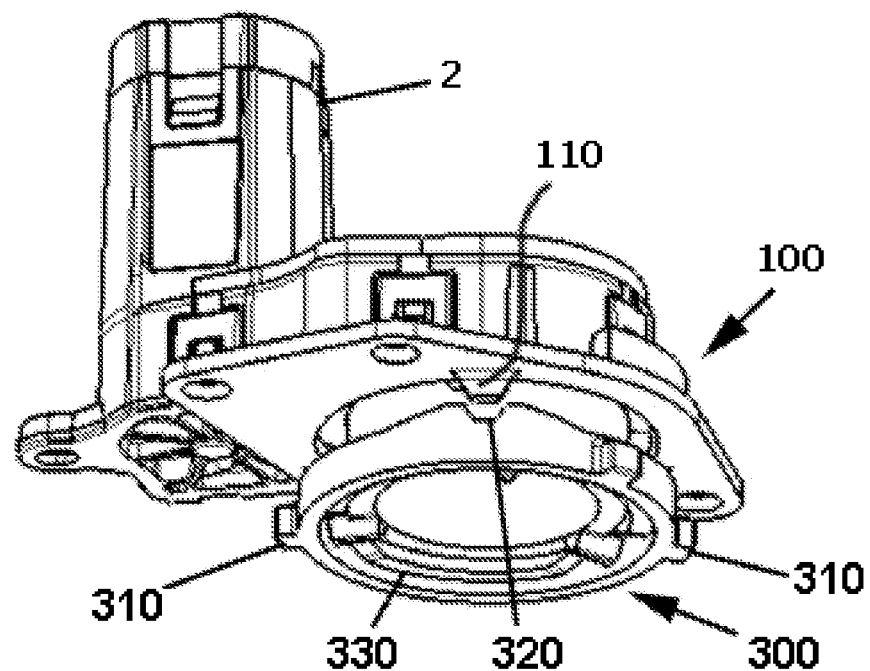
FIG. 3 is a bottom perspective view showing a portion of the rear-view mirror housing showing the first member, the second member and the third member.
Figure 4:
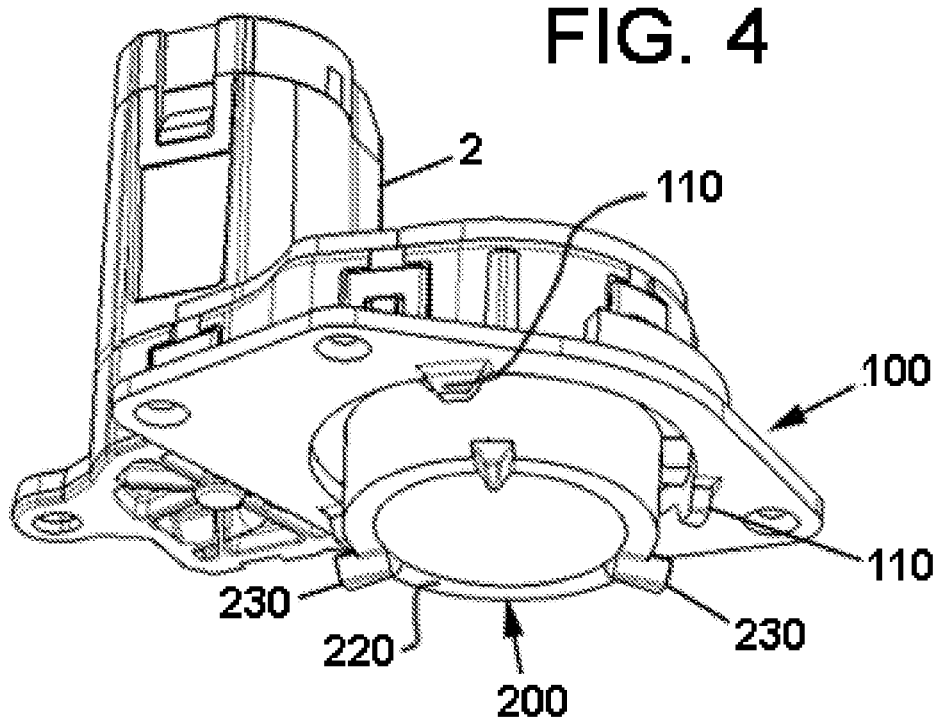
FIG. 4 is a bottom perspective view showing a portion of the rear-view mirror housing with the first member and the second member.
Figure 5:
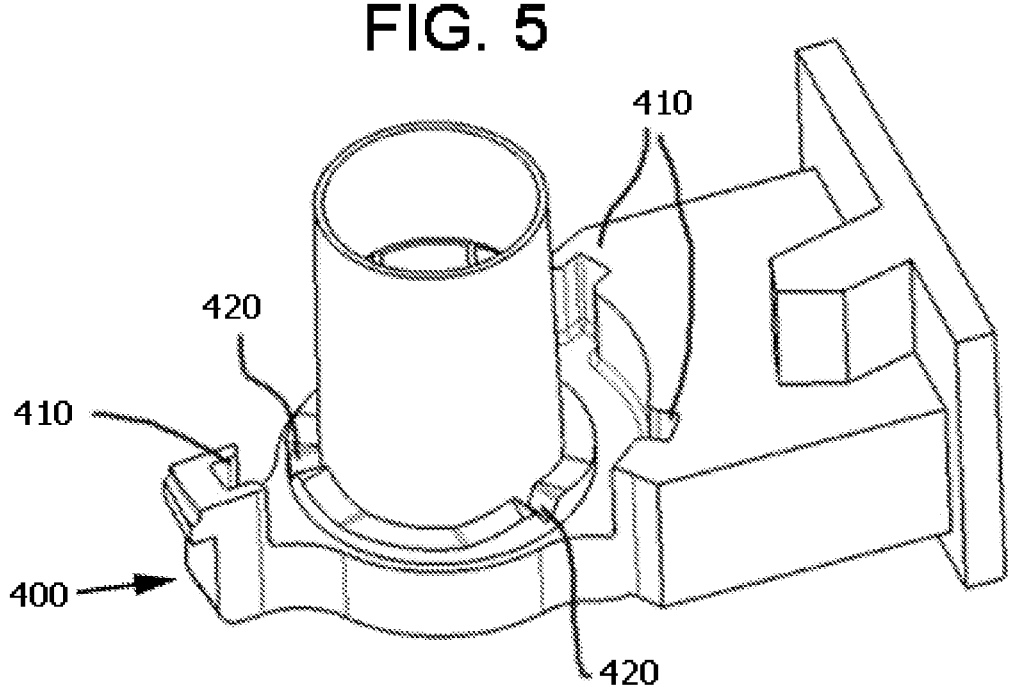
FIG. 5 is a top perspective view of the fixed part of the motor vehicle.
Figure 6:
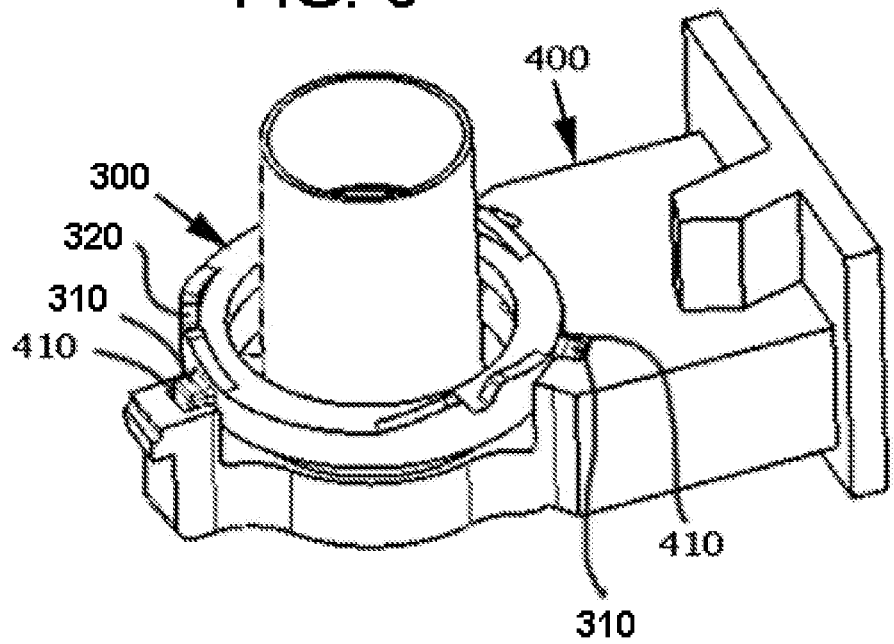
FIG. 6 is a top perspective view of the fixed part of the motor vehicle with the third member fitted thereon.

The fold rear-view mirror assembly in the example shown further comprises an actuator mechanism 10 which has been fully illustrated in FIGS. 1 and 2. The actuator mechanism 10 is intended to allow the rear-view mirror housing 1 to be properly positioned manually in a suitable angular position, specifically in a driving position, for example, when an external force or impact is applied to the rear-view mirror, when the rear-view mirror is manually operated, or when no power is available, etc.

The actuator mechanism 10 comprises the first member 100 that is attached to the rear-view mirror housing 1 so that it is movable therewith relative to the fixed part 400. As illustrated in the drawings, the first member 100 has first locking portions 110 extending downwards whose purpose will be described below.

The actuator mechanism 10 of the present fold rear-view mirror assembly 1 further comprises a third member 300. The third member 300 includes first locking portions 310 which, in the example shown, comprise projections extending radially outwards to be received into corresponding first locking portions 410 which, in the example shown, comprise recesses formed radially in the fixed part 400 of the motor vehicle. As the radial projections 310 of the third member 300 are inserted within the corresponding radial recesses 410 of the fixed part 400, the third member 300 remains always locked against rotation.

The actuator mechanism 10 further comprises a second member 200 that is arranged concentrically to the above-mentioned stem of the fixed part 400 as described above. Also, as shown in the figures, the third member 300 is arranged concentrically to the second member 200.

Both the second member 200 and the first member 100 can be rotated around the above mentioned upwardly extending stem of the fixed part 400. The third member 300 is arranged concentrically to the stem of the fixed part 400.

The second member 200 has a first driving portion 210 and a second driving portion 220.

The first driving portion 210 is a toothed ring that engages a driving gear 120 which is in turn driven by the electric motor, not shown, that is fitted in the motor housing 2.

The second driving portion 220 of the second member 200 has first and second driving elements which in the example shown are radial and downward projections 230 protruding radially and downwardly from the second driving portion 220 of the second member 200 so as to perform two different functions. The second driving portion 220 of the second member also has locking elements, which in the example shown in the figures are integrated in the radial and downward projections 230. The radial and downward projections 230 are configured with a flat upper surface and a downward projecting wedge shaped lower portion formed with two inclined planes. The flat upper surface of the radial and downward projections 230 acts as driving element with the purpose of moving the third member 300 in a direction D1 towards the first member 100 as the second member 200 is rotated relative to the fixed part 400 sliding on inclined inner guides or planes 330 formed in the third member 300. On the other hand, the downward projecting wedge shaped lower portion of the radial and downward projections 230 acts as a locking mechanism with the purpose of locking the second member 200 to the locking portions 420 of the fixed part 400. The radial and downward projections 230 have therefore a dual purpose as stated above although both functions could be performed by separate or integral parts.

It is to be noted that the second member 200 is attached to the first member 100 such that as the mirror housing 1 is actuated by the electric motor the torque applied is not high enough to unlock the radial and downward projections 230 of the second member 200 relative to the fixed part 400. As a result, the first member 100 rotates around the first driving portion 210. On the other hand, as the mirror housing 1 is actuated manually by the user, no relative movement exists between the first member 100 and the second member 200. Thus, the first member 100 and the second member 200 are both rotated together relative to the fixed part 400. Rotation of the first member 100 and the second member 200, causes the third member 300 to be displaced upwards and to be able to lock the first member 100 at a predetermined position and both the first member 100 and the third member 300 are locked in rotation as the third member 300 cannot be rotated.

Three different torque values are defined as follows. A first torque T1 corresponds to a torque that is applied when the first member 100 is driven by the electric motor for actuating the mirror housing 1. When the first torque T1 is applied by the electric motor, the first member 100 is rotated around the first driving portion 210 of the second member 200 as the second member 200 is locked to the fixed part 400. A second torque T2 corresponds to a torque that is applied when the first member 100 is driven manually by the user. In this case, the first member 100 does not rotate relative to the second member 200, that is, the first and second members 100, 200 rotate together, because as the first member is not driven by the motor electric, there is mechanical block between the first driving portion 210 and the driving gear 120. A maximum predetermined torque Tmax corresponds to a torque that is to be applied to unlock the second member 200 from the fixed part 400 as the mirror housing 1 is driven manually.

Thus, according to the above different torque values, the following is met:

$T1 < Tmax < T2$

Thus, as the first member 100 is rotated applying the first torque T1 by the electric motor which is a torque that does not exceed the maximum predetermined torque Tmax, the second member 200 remains locked in rotation to the fixed part 400.

On the other hand, when the second member 200 and the fixed part 400 are interlocked, the radial and downward projections 230 are located in corresponding recesses 331 formed on an inner guide formed in the third member 300. As the first member 100 is rotated manually by the user applying the second torque T2 exceeding the maximum predetermined torque Tmax, the radial and downward projections 230 move the third member 300 upwards along the direction D1 towards the first member 100 which, due to the radial and downward projections 230 leave the locking portions 420 of the fixed part 400 and the corresponding recesses 331 of the inner guide formed in the third member 300, into a flat area 332 formed on inner guides 330 resulting in that the third member 300 moves upward along direction D1 towards the first member 100. Rotation of the first member 100 causes the locking portions 110 of the first member 100 to move above the third member 300 reaching recesses 320 where both members 300, 100 are interlocked.

When the actuator mechanism 10 is in the previous position, with the first member 100 and the third member 300 interlocked, two actions can be taken: an electric actuation or another manual or external torque.

If the electric motor is actuated, since the first member 100 is locked with the third member 300, the second member 200 rotates relative to the above-mentioned stem of the fixed part 400 until the radial downward projections 230 fit into the locking portions 420 again and in turn the upper surface of the radial downwardly projections 230 enters in the recess 331 of the inner guides 330 formed in the third member 300. As consequence, the third member 300 returns to its original position by gravity moving in a direction D2 towards the fixed part 400. On the other hand, as the second member 200 is locked again to the fixed part 400 and the third member 300 is unlocked to the first member 100, the first member 100 starts to rotate around the second member 200 until a final position is reached.

On the other hand, it may occur that at the beginning of the movement of the second member 200, the third member 300 is caused to move downwards along direction D2 before the radial downwardly projections 230 are locked into the locking portions 420 of the fixed part 400 such that the third member 300 is unlocked from the first member 100. Thus, the second member 200 is stopped and the first member 100 rotates until it is stopped such as, for example, by mechanical blocking such as an end of run stop. Then the second member 200 rotates until the radial downwardly projections 230 are locked into the locking portions 420 of the fixed part 400 as the electric motor is stopped.

In both cases above, a reset feature is provided by which the mirror housing 1 is returned to its normal operation so that it can be driven again by the electric motor or manually.

If the rear-view mirror is actuated externally by a manual force or by an impact, the torque will eventually be enough to overcome the locking between first locking portions 110 and second locking portions 320. The first and second locking portions 110, 320 are disengaged from each other and the first member 100 together with the second member 200 rotate relative to the third member 300, and to the fixed part 400, until the radial downward projections 230 and locking portions 420 of the fixed part 400 are engaged again in another position.

The third member 300 has inner guides 330 adapted to receive the above mentioned radial projections 230 of the second member 200 to slide therein. The inner guides 330 of the third member 300 include inclined planes, as well as corresponding recesses 331 and flat areas 332, to help the third member 300 to move along the directions D1, D2 towards and away from the first member 100 as the first member 100 is rotated together with the second member 200 relative to the fixed part 400 of the motor vehicle.

Although only a number of particular embodiments and examples of the present actuator mechanism for manual operation of a fold rear-view mirror assembly for motor vehicles have been disclosed herein, it will be understood by those skilled in the art that other alternative examples and/or uses and obvious modifications and equivalents thereof are possible. The present disclosure covers all possible combinations of the particular examples described.

The use of terms "first", "second", etc. for indicating different parts does not involve any order and does not necessarily exclude other further parts. Reference signs related to drawings and placed in parentheses in a claim, are solely for attempting to increase the intelligibility of the claim, and shall not be construed as limiting the scope of the claim.

The scope of the present disclosure should not be limited by particular examples, but should be determined only by a fair reading of the claims that follow.

What is claimed is:

1. An actuator mechanism for a fold rear-view mirror assembly for motor vehicles, the actuator mechanism comprising:
    a first member associated with a pivotable rear-view mirror housing and movable therewith; and
    a second member arranged such that a third member is disposed concentrically surrounding the second member, the second member being configured to:
        lock in rotation to a fixed part of a motor vehicle as the first member is rotated by a first torque that does not exceed a maximum predetermined torque; and
        move the third member in a direction towards the first member as the first member is rotated with a second torque that exceeds the maximum predetermined torque, causing the first member and the third member to be interlocked in a predetermined position of the first member,
    wherein the third member is configured to be moved in a direction towards the first member and in a direction away from the first member.

2. The actuator mechanism of claim 1, wherein the second member comprises a first driving portion configured to be driven by a driving mechanism so as to rotate the first member, and a second driving portion having a number of driving elements for driving the third member in a direction towards the first member as the first member is rotated relative to the fixed part.

3. The actuator mechanism of claim 2, wherein the third member is provided with inner guides through which the driving elements of the second driving portion are allowed to slide, the inner guides having inclined planes to enable the second member to move the third member in directions towards and away from the first member.

4. The actuator mechanism of claim 1, wherein the second member is arranged to rotate with the first member.

5. The actuator mechanism of claim 4, wherein the second member comprises first driving elements suitable to drive the third member in a direction towards the first member as the first member is rotated relative to the fixed part.

6. The actuator mechanism of claim 1, wherein the second member is configured to lock in the fixed part as the first member is rotated relative to the second member with the first torque not exceeding the maximum predetermined torque.

7. The actuator mechanism of claim 1, wherein the second member includes external guides integrally formed thereon through which second locking portions of the third member are allowed to slide, the external guides having inclined planes to move the third member in directions toward and away from the first member.

8. The actuator mechanism of claim 1, wherein the third member includes first locking portions to engage corresponding first locking portions formed in the fixed part of the motor vehicle so as to lock the third member in rotation.

9. The actuator mechanism of claim 8, wherein the first locking portions comprise locking projections adapted to be received in corresponding locking recesses formed in the fixed part of the motor vehicle so as to lock the third member in rotation.

10. The actuator mechanism of claim 8, wherein the first member has a number of first locking portions adapted to be locked in corresponding of second locking portions of the third member.

11. The actuator mechanism of claim 10, wherein the first locking portions comprise projections and the second locking portions of the third member comprise recesses adapted for receiving the projections.

12. The actuator mechanism of claim 1, wherein the predetermined position where the first member and the third member are interlocked together corresponds to a position of a rear-view mirror housing for driving a motor vehicle.

13. A fold rear-view mirror assembly for motor vehicles comprising a rear-view mirror housing adapted to rotate relative to the fixed part that is attached to a motor vehicle, and the actuator mechanism of claim 1.

14. An actuator mechanism for a fold rear-view mirror assembly for motor vehicles, the actuator mechanism comprising:
    a first member being movable with a pivotable rear-view mirror housing; and
    a second member arranged such that a third member is disposed concentrically surrounding the second member, the second member being configured to:
        lock in rotation to a fixed part of a motor vehicle as the first member is rotated by a first torque that does not exceed a maximum predetermined torque; and
        move the third member in a direction towards the first member as the first member is rotated with a second torque that exceeds the maximum predetermined torque, causing the first member and the third member to be interlocked in a predetermined position of the first member,
    wherein the third member is configured to move in a direction towards the first member and in a direction away from the first member.

15. The actuator mechanism of claim 14, wherein the second member comprises a first driving portion configured to be driven by a driving mechanism so as to rotate the first member, and a second driving portion having a number of driving elements for driving the third member in a direction towards the first member as the first member is rotated relative to the fixed part.

16. The actuator mechanism of claim 15, wherein the second member includes external guides integrally formed thereon through which second locking portions of the third member are allowed to slide, the external guides having inclined planes to move the third member in directions toward and away from the first member.

17. The actuator mechanism of claim 14, wherein the second member is arranged to rotate with the first member.

18. The actuator mechanism of claim 17, wherein the second member comprises first driving elements suitable to drive the third member in a direction towards the first member as the first member is rotated relative to the fixed part.

19. The actuator mechanism of claim 18, wherein the second member is configured to lock in the fixed part as the first member is rotated relative to the second member with the first torque not exceeding the maximum predetermined torque.

20. An actuator mechanism for a fold rear-view mirror assembly for motor vehicles, the actuator mechanism comprising:
   a first member that moves with a rear-view mirror housing and movable therewith; and
   a second member arranged such that a third member is disposed concentrically surrounding the second member, the second member being configured to:
      lock in rotation to a part of a motor vehicle as the first member is rotated by a first torque that does not exceed a maximum predetermined torque; and
      move the third member in a direction towards the first member as the first member is rotated with a second torque that exceeds the maximum predetermined torque, causing the first member and the third member to be interlocked in a predetermined position of the first member,
   wherein the third member is configured to be moved in a direction towards the first member and in a direction away from the first member.

* * * * *